Feb. 9, 1960  R. D. WHITE  2,924,242
VALVE

Filed Dec. 11, 1957  2 Sheets-Sheet 1

INVENTOR.
ROBERT D. WHITE
BY
Bates Teare & McBean
ATTORNEYS

Feb. 9, 1960
R. D. WHITE
2,924,242
VALVE
Filed Dec. 11, 1957
2 Sheets-Sheet 2
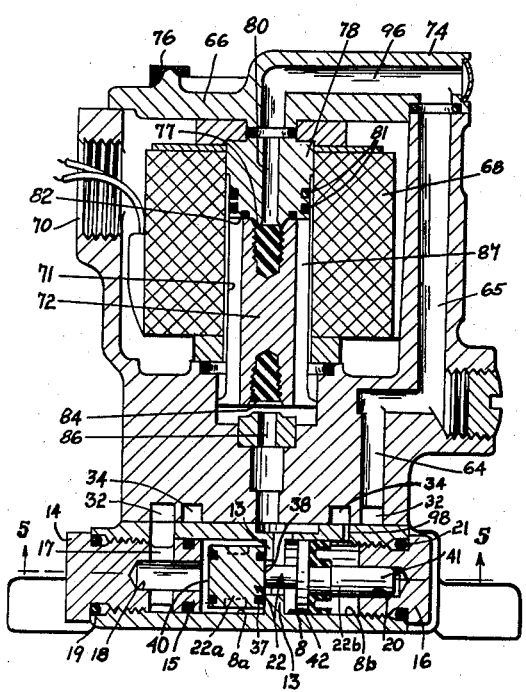
Fig.—4
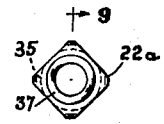
Fig.—8
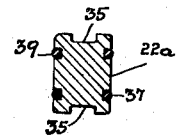
Fig.—9
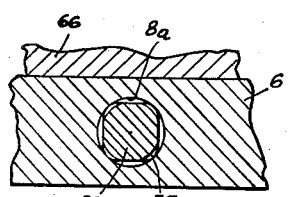
Fig.—6
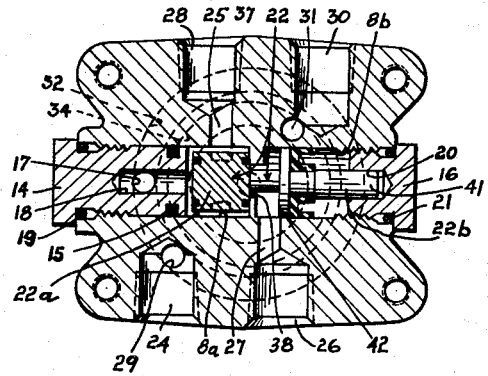
Fig.—5
INVENTOR.
ROBERT D. WHITE
BY
Bates Teare & McBean
ATTORNEYS ent Office 2,924,242
Patented Feb. 9, 1960

2,924,242
VALVE

Robert D. White, Wadsworth, Ohio, assignor, by mesne assignments, to International Basic Economy Corporation, New York, N.Y., a corporation of New York Application December 11, 1957, Serial No. 702,078

10 Claims. (Cl. 137—623)

This invention relates to valves and more particularly to valves which are used for controlling the flow of fluid in gaseous or liquid systems.

In many applications involving fluid control valves, the use of a four-way valve is required. For example, a four-way fluid control valve is necessary to control two working cylinders, or two ends of a double acting cylinder. Such four-way valves must have an inlet or fluid-supply port, two cylinder ports, and an exhaust port. Additionally, the valve must be adapted to supply and exhaust each of the cylinder ports independently of the other.

Heretofore, four-way action has been obtained, for example, by using two three-way solenoid operated valves, each operating independently, but joined electrically. Four-way action may be effected also by using two three-way plunger-type valves pneumatically connected in parallel (i.e. both valves using common supply and exhaust ports). With either arrangement, one three-way valve is normally open and the other three-way valve is normally closed. Since the valves operate simultaneously, the resulting action is that of a four-way valve. Four-way action may be achieved also with a solenoid operated plunger-type fluid control valve, the four-way action being effected by providing the main plunger with a plurality of lands and necked-down portions as required, thereby substantially increasing the length of the plunger as well as the overall size of the valve. Accordingly, the aforementioned valve structures are unnecessarily large and cumbersome, which renders them unadaptable to many present day applications wherein the space available for fluid control equipment is exceedingly limited.

An object of the invention is to provide a solenoid operated plunger-type four-way valve that is substantially reduced in size in comparison with four-way valves heretofore known, and which contains all the desirable features and operating characteristics of such previous valves.

A further object of the invention is to provide a solenoid operated four-way plunger-type valve in which the main plunger valve mechanism, including its housing, has substantially the same horizontal cross sectional area as that of the solenoid valve which triggers it.

A further object of the invention is to provide a three-way solenoid operated pilot control mechanism combined with a three-way plunger-type valve, wherein the solenoid mechanism functions as a three-way valve and additionally functions to control reciprocation of the main plunger in the plunger-type valve, said three-way plunger-type valve being connected in parallel with the three-way action of the solenoid mechanism to effect a four-way valve.

A further object of the invention is to provide a solenoid operated plunger-type four-way valve that is efficient, durable, and requires little maintenance and which affords complete flexibility of operation.

A further object of the invention is to provide a solenoid operated plunger-type four-way valve of simplified construction which is easy to assemble and disassemble.

Briefly, the foregoing objects are accomplished by the provision of a solenoid operated plunger type four-way valve having a two-piece plunger which is reciprocated by the admission and discharge of pressurized fluid to and from the larger end of the plunger, there being inlet pressurized fluid maintained at the smaller end of the plunger at all times. The valve is a unitary structure and includes a plunger valve portion or mechanism having the two-piece plunger, and additionally includes a solenoid operated pilot control valve disposed above the plunger valve mechanism for triggering the two-piece plunger. The plunger valve mechanism contains an inlet or supply port, two cylinder ports, and an exhaust port, and is adapted to supply and exhaust pressurized fluid to and from one of the cylinder ports. The solenoid operated pilot control valve, in addition to its function of triggering the two-piece plunger, is adapted also to supply and exhaust pressurized fluid to and from the other cylinder port independently of the action of the plunger valve mechanism. Both the plunger valve mechanism and the solenoid operated pilot control valve are pneumatically connected in parallel, wherein each uses a common fluid supply port and a common exhaust port. Thus a compact, unitary, four-way valve is achieved by using only one plunger-type three-way valve and one three-way solenoid operated pilot control valve.

Other objects and advantages of the invention will be apparent from the following description taken in conjunction with the accompanying drawings wherein:

Fig. 4 is a vertical sectional view similar to Fig. 1, but showing the solenoid plunger disposed in its upper position in the valve housing, and showing the main plunger disposed at its right end position in the plunger valve housing;

Fig. 5 is a horizontal sectional view taken along the line 5—5 of Fig. 4;

Fig. 6 is a vertical sectional view taken along the line 6—6 of Fig. 1;

Fig. 8 is an end view of the left portion of the main plunger shown in Fig. 1;

Fig. 9 is a sectional view taken along the line 9—9 of Fig. 8.

Figure 1:
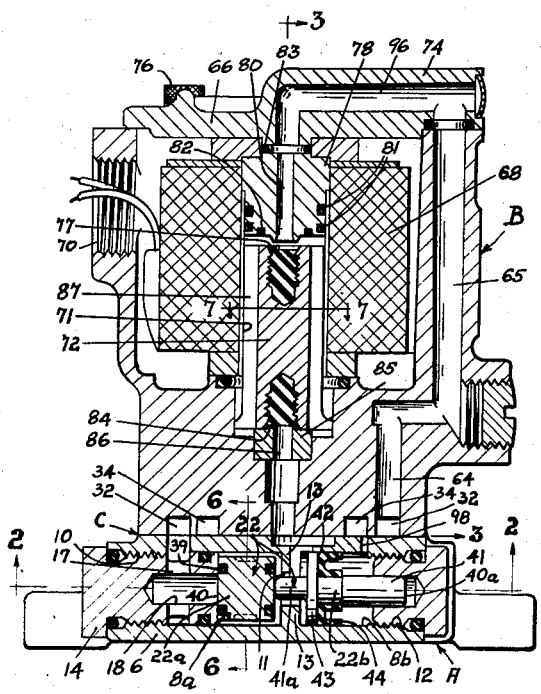
Fig. 1 is a front vertical sectional view through a solenoid operated plunger-type control valve constructed in accordance with the invention.

Referring to the drawings, there is shown a main plunger valve portion or mechanism A and a single solenoid operated pilot control valve or mechanism B, which have complementary meeting faces on the parting line C. The valves A and B may be contained in a common housing, or each may be contained in its own housing as shown.

The plunger valve A includes a housing or body 6 having a longitudinal cylindrical bore 8, which has the threaded openings 10 and 12 at each end thereof respectively. The bore 8 is formed into two distinct portions, namely a left portion 8a and a right portion 8b, which contain the respective parts of the two-piece plunger 22 which will be hereinafter described in detail. The bore portions 8a and 8b are separated by an annular projection or flange in the form of the plunger stop member 13 disposed substantially centrally in the bore 8 and which projects only partially into the bore to form an orifice or opening 11 to permit fluid flow between the bore portions 8a and 8b.

Disposed in the threaded bore openings 10 and 12 are the end caps or plugs 14 and 16 respectively. The end cap 14 contains an annular seal ring 15 positioned at its inner end to prevent fluid flow between the longitudinal wall of the bore portion 8a and the end cap. An annular seal ring 19 is disposed near the outer end of the cap 14 between the cap and the bore 8 to prevent the flow of fluid thereby. The end caps 14 and 16 contain the longitudinal bores 18 and 20 respectively, which form reduced diameter extensions of the main bore 8. The bore 18 is in communication with the solenoid outer annular passageway 32 through the passageway 17, which is disposed in the end cap 14 and the housing 6.

Disposed in the main plunger valve housing 6 is a series of ports and connecting passageways which are adapted to channel the flow of pressurized fluid through the valve in a predetermined manner. Situated on one side of the housing 6 is an inlet or supply port 24 (Fig. 2) and an exhaust port 26. Disposed on the opposite side of the housing 6 are the cylinder ports 28 and 30 respectively which may serve, for example, two piston-cylinder mechanisms or two ends of a double acting cylinder (not shown). A passageway 25 connects the cylinder port 28 with the bore portion 8a, and a passageway 27 connects the exhaust port 26 with the bore portion 8b. The supply port 24 communicates with the solenoid outer annular passageway 32 through the passageway 29, which is formed in the housing 6. The cylinder port 30 is in direct communication with the solenoid inner annular passageway 34 through the passageway 31 formed in the housing 6.

Within the bore 8 there is a reciprocable two-piece plunger 22, which functions to control the flow of fluid to and from the cylinder port 28, as will be hereinafter described, and includes a separate forward valve or seal head portion 22a reciprocably disposed in the bore portion 8a, and a separate piston or shaft portion 22b reciprocably disposed in the bore portion 8b. The plunger portions 22a and 22b function as an integral unit when reciprocated, but are not mechanically connected. Although the plunger 22 is shown and described as a two-piece device, it could be formed in one piece. However, the two-piece construction is easier to manufacture and substantially simplifies the assembly of the valve A.

The plunger portion 22a is of substantially rectangular configuration in longitudinal vertical section and in transverse section (Figs. 1 and 6) and contains a substantially annular groove 35 (Figs. 8 and 9) transversely thereabout to permit fluid flow therearound. The longitudinal edges of the square configuration are beveled or rounded (Fig. 6) so as to act as a guide means for the plunger portion 22a within the bore portion 8a when it reciprocates therein. With this construction, the groove 35 allows pressurized fluid to pass around the periphery of the plunger portion 22a, while the rounded longitudinal edges of the plunger portion 22a guide the plunger portion smoothly and efficiently in the bore. The plunger portion 22a contains an annular seal ring 37 (Fig. 4) on its inner face 38, which is adapted for sealing contact with the projection 13 to seal the flow of fluid thereby when the plunger 22 is disposed at its right end position in the bore 8. The outer or left face 40 (Fig. 1) of the plunger portion 22a contains the seal ring 39 which is adapted to seal against the inner end or face of the end cap 14 to prevent the flow of fluid between the end cap bore 18 and the main bore 8 when the plunger 22 is disposed at its left end position in the bore. Thus the plunger portion 22a forms a means for controlling the flow of fluid from one portion of the bore to another portion thereof. The displacement or travel of the plunger portion 22a in the bore portion 8a is limited by the projection 13 at one end and the inner face of the end cap 14 at the other end.

The plunger portion 22b includes a shaft 41 (Fig. 1) having a fluid pressure retaining or seal head 42 disposed thereon. The shaft 41 includes a left shaft portion 41a positioned inwardly of the head 42. The shaft portion 41a extends into the opening 11 and forms, in effect, a necked-down portion of the plunger 22 having a diameter substantially less than the opening 11 to allow fluid flow therethrough. The shaft portion 41a is adapted to abut against the plunger portion 22a, but is not mechanically connected thereto. The seal head 42 includes a disc portion 43 and an annular seal ring 44 disposed adjacent thereto. Although the seal ring 44 is shown as being U-shaped, in longitudinal vertical section, it may be of any suitable shape which will effect a suitable sealing action along the longitudinal wall of the bore 8 as the plunger is reciprocated therein. The outer extremity of the shaft 41 is telescopically disposed in the end cap bore 20 with a fit tight enough to enable said extremity to form a guide means for the plunger portion 22b as it reciprocates in the bore, yet such fit is not a fluid tight fit so that fluid may flow along the longitudinal wall of the extremity and into the outer end of the bore 20.

Each of the portions 22a and 22b of the two-piece plunger 22 is shown as being disposed in its own separate portion of the bore 8 and, in the present instance, each of such bore portions 8a and 8b is of the same cross-sectional area. However, the bore portions 8a and 8b may be of different cross-sectional area provided, however, that the right bore portion 8b is of equal or larger cross-sectional area than the left bore portion 8a to enable the plunger to reciprocate by reason of the difference in cross-sectional area of the opposite ends of the plunger as will be hereinafter described in detail.

Reciprocation of the main plunger 22 is controlled by the solenoid operated pilot control valve B, the operation of which will now be described. The solenoid valve B includes a body or housing 66 (Fig. 1) in which is fixed a solenoid coil 68, which is in accessible communication with the junction box portion 70 of the housing 66. The solenoid coil 68 contains a longitudinal, vertical bore 71 in which an armature or stem 72 is vertically reciprocable, responsive to energization and deenergization of the solenoid coil by any suitable timer device. A cap 74 is retained on top of the housing 66 by the cap screws 76.

Figure 7:
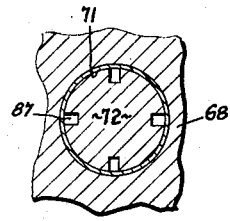
Fig. 7 is an enlarged sectional view taken along the line 7—7 of Fig. 1.

Disposed at the upper end of the armature 72 is a valve seat or head 77, which seats against the lower end of the block or plug 78 when the armature is in its upper or energized position, in the bore 71, thereby preventing the flow of pressurized fluid downward through the passageway 80. The plug 78 contains the annular seals 81 and 82 to prevent the flow of fluid past the plug at these points. Additionally, an annular seal 83 is disposed between the plug 78 and the housing 66 to prevent the flow of fluid therebetween. Disposed at the lower end of the armature 72 is a valve head or seat 84 which seats against the plug 85 when the armature is in its lower or deenergized position in the bore 71, thereby preventing the flow of fluid through the exhaust passageway 86. The sides of the armature 72 contain a plurality of slots 87 (Figs. 1 and 7) to permit fluid flow through the coil bore 71.

Figure 3:
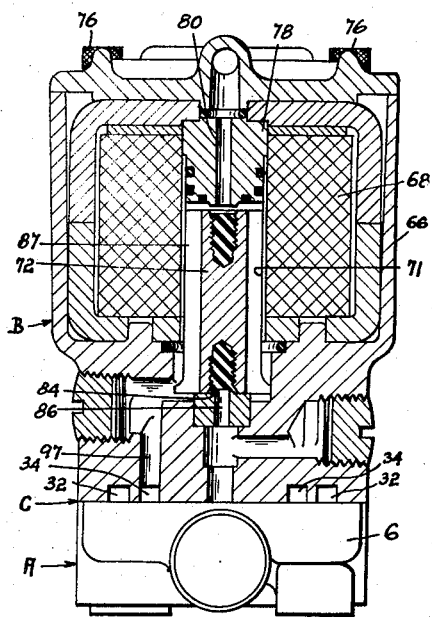
Fig. 3 is a side elevational view of the valve shown in Fig. 1, with the plunger valve mechanism being shown in full, and the solenoid pilot control valve being shown in section as taken along the line 3—3 of Fig. 1.

Operation of the four-way valve of the invention will now be described. When the solenoid operated pilot control valve B is deenergized, the armature 72 is in its lower position (Fig. 1) in the solenoid coil bore 71, whereby the armature upper valve head 77 is open and the armature lower valve head 84 is closed. This permits pressurized fluid to flow from the inlet port 24 (Fig. 2), up the passageway 29, into the solenoid outer annular passageway 32 (Fig. 1), up the passageways 64 and 65 in the solenoid housing 66, across the passageway 96, down the passageway 80, past the open valve head 77, down the slots 87 in the side of the armature 72, down the passageway 97 (Fig. 3), and into the solenoid inner annular passageway 34. From the annular passageway 34, the fluid flows into two separate passageways. In the first instance, it flows from the annular passageway 34, down the passageway 31 (Fig. 2) in the housing 6, and into the cylinder port 30 thereby supplying the port 30 with pressurized fluid from the supply port 24. In the second instance, the fluid flows from the passageway 34, down the passageway 98 (Fig. 1) in the housing 6, and into the bore portion 8b, wherein the pressurized fluid acts against the right end of the pressure or seal head 42 and against the right end 40a of the plunger portion 22b and forces the entire plunger assembly 22 to its left end position in the bore 8 as shown in Fig. 1. When the plunger is in such left end position, pressurized fluid flows from the cylinder port 28 (Fig. 2), through the passageway 25, into the bore portion 8a, past the open plunger seal 37, through the opening 11 and over the plunger shaft portion 41a, into the left portion of the bore 8b, through the passageway 27, and out the exhaust port 26, thereby exhausting the cylinder port 28. At the same time, fluid may flow from the inlet port 24, up the passageway 29 in the housing 6, and into the solenoid outer annular passageway 32 (Fig. 1) as aforedescribed, down the passageway 17 in the housing 6, and into the bore 18 in the end cap 14, wherein the fluid acts against a portion of the left face or end 40 of the plunger 22. However, the plunger remains in its left end position in the bore 8, since the cross-sectional area exposed to fluid pressure at the right end of the plunger 22 (namely, the right end of the head 42 plus the right end 40a of the plunger portion 22b) is greater than the cross sectional area exposed to fluid pressure at the left end 40 of the plunger. Thus, the plunger 22 is reciprocated by the area differential principle.

When the solenoid operated pilot control valve B is energized, the armature 72 is displaced to its upper position (Fig. 4) in the coil bore 71, whereby the lower valve head 84 is open and the upper valve head 77 is closed. This permits pressurized fluid to flow from the inlet port 24 (Fig. 5), up the passageway 29 in the housing 6, into the solenoid outer annular passageway 32, down the passageway 17 (Fig. 4), and into the end cap bore 18, and into the bore portion 8a, wherein the fluid acts against the left end 40 of the plunger 22 and displaces the plunger to its right end position in the bore 8, since the pressurized fluid formerly acting against the right end of the plunger is now exhausted from the right end of the bore portion 8b, up the passageway 98, into the solenoid inner annular passageway 34, up the solenoid passageway 97 (Fig. 3), past the open valve head 84 (Fig. 4), down the exhaust passageway 86, into the left end of the bore portion 8b, out the exhaust passageway 27 (Fig. 5), and out the exhaust port 26. When the plunger 22 is in such right end position in the bore 8, inlet fluid may flow from the inlet port 24 (Fig. 5), up the passageway 29, into the solenoid outer annular passageway 32, down the passageway 17 (Fig. 4), into the end cap bore 18, into the bore portion 8a, through the passageway 25 (Fig. 5), and into the cylinder port 28, thereby supplying pressurized fluid to said cylinder port from the inlet port 24. Additionally, inlet pressurized fluid in the solenoid outer annular passageway 32 may flow up the passageway 64 (Fig. 4), up the passageway 65, across the passageway 96, and down the passageway 80, but is stopped by the closed valve head 77. At the same time, the cylinder port 30 (Fig. 5), is exhausted, whereby the pressurized fluid therein flows up the passageway 31, into the solenoid inner annular passageway 34, up the solenoid passageway 97 (Fig. 3), past the open valve head 84 (Fig. 4), down the solenoid exhaust passageway 86, into the left end of the bore portion 8b, out the passageway 27 (Fig. 5), and out the exhaust port 26. Accordingly, when the plunger 22 is in its right end position in the bore 8, the cylinder port 30 is exhausted and the cylinder port 28 is supplied with pressurized fluid from the inlet port 24. The cylinder port 28 cannot exhaust through the bore 8 and out the exhaust port 26 by reason of the plunger head 22a sealing against the bore projection 13.

With the solenoid operated pilot control valve B, a means is provided for performing the dual function of triggering the main plunger 22, and of supplying and exhausting pressurized fluid to and from the cylinder port 30.

In both the energized and deenergized positions of the solenoid valve B, pressurized fluid is always maintained against the left or smaller end 40 of the plunger 22, thereby providing a means for biasing the plunger toward the right end of the bore B, with reciprocation of the plunger being effected by supplying and exhausting pressurized fluid to and from the right or larger end of the plunger. Thus, reciprocation is effected by the area differential principle, with fluid under pressure being applied at all times to at least one or both ends of the plunger. When the solenoid operated pilot control valve B is deenergized, pressurized fluid is applied to the right or larger end of the plunger 22 and the plunger returns to its left end position in the bore 8 (Fig. 1), whereby pressurized fluid is exhausted from the cylinder port 28 (which is the cylinder port controlled by the plunger valve A). Accordingly, in the event of a power failure, the plunger valve A will be in closed position.

With the present construction, a three-way solenoid operated pilot control valve is pneumatically connected in parallel with a three-way plunger valve to effect a unitary, compact, four-way valve. In comparison with previous constructions, only one, instead of the usual two, plunger valves are employed to achieve the four-way action, thereby effecting a substantial saving of space and materials.

Figure 2:
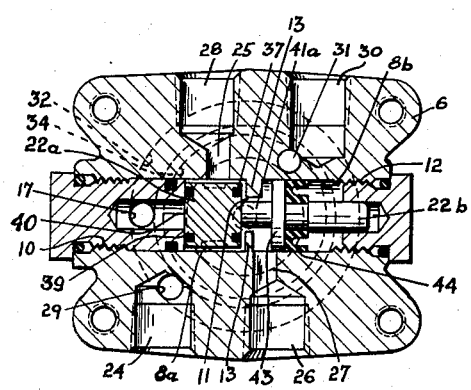
Fig. 2 is a horizontal sectional view taken along the line 2—2 of Fig. 1.

Additionally, the plunger valve A is substantially reduced in size in comparison with previous constructions. More specifically, the horizontal cross sectional area of the plunger valve A, as shown in Figs. 2 and 5, is substantially the same size as the horizontal cross-sectional area of the solenoid pilot control valve B to which it is secured. With this arrangement, a compact, unitary, four-way valve is provided that is sufficient and durable.

I claim:

1. A four-way fluid control valve having two cylinder ports comprising, a three-way plunger type valve having a reciprocable plunger for controlling the flow of pressurized fluid to and from one of the cylinder ports, and a three-way solenoid operated pilot control valve for reciprocating the plunger and for controlling the flow of pressurized fluid to and from the other cylinder port and an exhaust port and a supply port each communicating with both said three-way valves.

2. A four-way fluid control valve having a supply port, two cylinder ports and an exhaust port and comprising, a plunger-type valve connected to the supply and exhaust ports and to one of the cylinder ports and having a reciprocable plunger for supplying and exhausting pressurized fluid to and from said one cylinder port, and a solenoid operated pilot control valve connected to the supply and exhaust ports and to the other cylinder port for triggering said plunger and for supplying and exhausting pressurized fluid to and from said other cylinder port.

3. A four-way fluid control valve comprising, a housing having an enclosed bore therein and having two cylinder ports, a plunger reciprocably disposed in said bore for controlling the flow of fluid to and from one of said cylinder ports when the plunger is reciprocated to predetermined positions in the bore, said plunger having an area exposed to fluid pressure at one of its ends greater than the area at its other end that is exposed to fluid pressure, means for maintaining pressurized fluid against said other end of the plunger to bias the plunger toward one end of the bore, and a solenoid operated pilot control valve for controlling the flow of fluid to and from the other cylinder port and for controlling the flow of fluid to and from said one end of the plunger to reciprocate the same.

4. A four-way fluid control valve having a supply port, two cylinder ports and an exhaust port and comprising, a plunger-type valve connected to the supply and exhaust ports and to one of the cylinder ports and having a reciprocable plunger for supplying and exhausting pressurized fluid to and from said one cylinder port, and a solenoid operated pilot control valve connected to the supply and exhaust ports and to the other cylinder port for supplying and exhausting pressurized fluid to and from said other cylinder port, said plunger-type valve having a horizontal cross sectional area substantially the same size as the horizontal cross sectional area of the solenoid operated pilot control valve.

5. A solenoid operated four-way fluid control valve comprising, a housing having an enclosed bore, a plunger disposed in said bore for reciprocation therein, a solenoid operated pilot control valve for reciprocating the plunger, said solenoid valve having a bore containing a reciprocable armature which is reciprocated in response to energization and deenergization of the solenoid valve, said housing having a supply port, two cylinder ports and an exhaust port in communication with said first-named bore, said plunger having means thereon for controlling the flow of fluid from said supply port to one of said cylinder ports when the plunger is disposed at one position in the bore and for controlling the flow of fluid from said one cylinder port to the exhaust port when the plunger is disposed at another position in the bore, said solenoid operated pilot control valve being connected to said supply and exhaust ports and to the other of said cylinder ports and adapted to control the flow of fluid from the supply port to the other of said cylinder ports when said armature is disposed in one position in the second-named bore and to control the flow of fluid from said other cylinder port to the exhaust port when the armature is disposed at another position in the second-named bore.

6. A four-way plunger type fluid control valve comprising, a housing having an enclosed bore therein and having a plurality of ports in communication with the bore, an annular flange projecting into the bore and dividing the same into a left bore portion and a right bore portion and forming an opening between the bore portions, a two-piece plunger reciprocably disposed in the bore for controlling the flow of fluid between certain of said ports when the plunger is reciprocated to predetermined positions in the bore, and a solenoid operated pilot control valve for reciprocating the plunger, said plunger comprising a separable head portion reciprocably disposed in said left bore portion and a separable piston portion reciprocably disposed in said right bore portion, said head portion having a seal ring at each end thereof for alternately sealingly engaging the adjacent end of the bore and the annular flange respectively when the plunger is reciprocated to control the flow of fluid through the bore and between said certain ports, said piston portion including a rod longitudinally disposed in the right bore portion and extending through said opening and engaging said head portion at its inner end, said rod having a fluid pressure head thereon for sealingly engaging the longitudinal wall of the right bore portion.

7. A four-way fluid control valve having a supply port, an exhaust port and two cylinder ports and comprising, a three-way plunger-type valve connected to the supply and exhaust ports and to one of the cylinder ports and a three-way solenoid pilot control valve, said plunger valve including a housing having a bore therein in communication with the ports, an annular flange projecting partially into the bore and dividing the same into a left bore portion and a right bore portion, a plunger reciprocably disposed in said bore for controlling the flow of fluid to and from the one cylinder port when the plunger is reciprocated to predetermined positions in the bore, an end cap disposed in each end of said bore, each of said caps having a longitudinal bore closed at the outer end and forming a reduced diameter extension of said first-named bore, said plunger having an area exposed to fluid pressure at one of its ends greater than the area at its other end that is exposed to fluid pressure, means for maintaining pressurized fluid against said other end of the plunger to bias the plunger toward one end of the first-named bore, said three-way solenoid operated pilot control valve being connected to the supply and exhaust ports and to the other cylinder port for controlling the flow of fluid to and from said other cylinder port and for controlling the flow of fluid to and from said one end of the plunger to reciprocate the same, said plunger comprising a separable head portion reciprocably disposed in said left bore portion and a separable piston portion reciprocably disposed in said right bore portion, said head portion having a seal ring on each end thereof for alternately sealingly engaging the inner end of the adjacent end cap and the annular flange respectively to control the flow of fluid to and from the one cylinder port when the plunger is reciprocated, said piston portion including a rod with a pressure head thereon for sealingly engaging the longitudinal wall of the right bore portion, said rod having its outer extremity telescopically disposed in the adjacent end cap bore to guide the piston portion in the first-named bore as it reciprocates therein.

8. A valve according to claim 3 wherein said bore has an annular flange therein dividing said bore into a left bore portion and a right bore portion, and said plunger comprises a separable head portion disposed in one portion of the bore and a separable piston portion disposed in the other portion of the bore, one of said portions including a member projecting through said flange to engage the other portion.

9. A valve according to claim 8 wherein said head portion has a seal ring disposed on each end thereof for alternately sealingly engaging the adjacent end of the bore and the annular flange, respectively, to control the flow of fluid through its respective cylinder port.

10. In a fluid control valve, a valve housing having a bore therein, an annular flange dividing said bore into a left bore portion and a right bore portion and forming an opening between the bore portions, a two-piece plunger reciprocably disposed in the bore, said plunger having a separable head portion reciprocably disposed in said left bore portion and a separable piston portion reciprocably disposed in said right bore portion, end caps for closing the ends of the bore portions to contain said plunger portions in their respective bore portions, said head portion including local corner regions slidingly engaging its respective bore portion and peripheral regions between said corners defining with the bore portion axial flow passages, and said head portion having a seal ring at each end thereof for alternately sealingly engaging the adjacent end cap of the left bore and said flange respectively when the plunger is reciprocated, and said piston portion including a pressure head sealingly engaging said right bore portion and a rod carried by said pressure head having one end extending through said flange to engage said head portion and having its opposite end telescopically slidable in the end cap of the right bore portion, and exhaust port communicating with said right bore portion between said flange and said pressure head, a cylinder port communicating with said left bore portion between its end cap and said flange, a supply port communicating with said left bore portion through said end cap at a location radially inside the seal ring of said head portion which engages said left end cap, and means for communicating supply pressure to the right bore portion between said pressure head and said right end cap.

References Cited in the file of this patent

UNITED STATES PATENTS

| | | |
|---|---|---|
| 2,608,995 | Gardner | Sept. 2, 1952 |
| 2,624,585 | Churchill et al. | Jan. 6, 1953 |